N. W. CLARK.
Fish-Hatching Apparatus.
No. 148,035. Patented March 3, 1874.
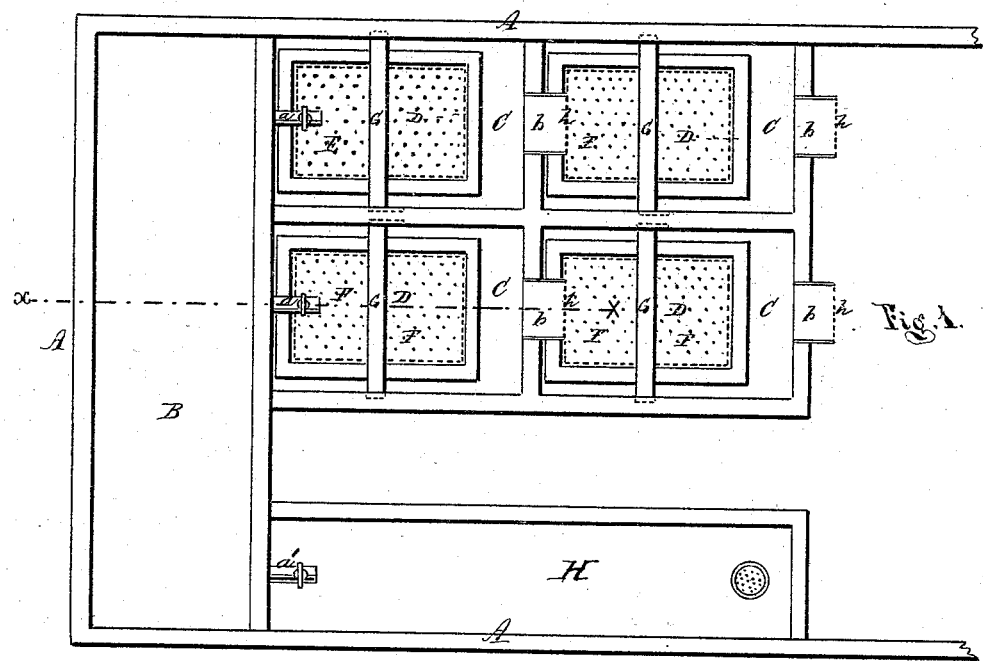

UNITED STATES PATENT OFFICE.

NELSON W. CLARK, OF CLARKSTON, MICHIGAN.

IMPROVEMENT IN FISH-HATCHING APPARATUS.

Specification forming part of Letters Patent No. 148,035, dated March 3, 1874; application filed January 7, 1874.

*To all whom it may concern:*

Be it known that I, NELSON W. CLARK, of Clarkston, in the county of Oakland and State of Michigan, have invented an Improvement in Fish-Hatching Houses and Boxes, of which the following is a specification:

The nature of this invention relates to new and useful improvements in the construction of hatching-boxes, and their arrangement in a hatching-house, and the arrangement of the other necessary parts to secure economy and safety in the manipulation of the eggs, and to preserve the fish after being hatched. The object of the invention is, first, to avoid the use of gravel as a hatching-bed, so that all danger of disturbing the eggs may be avoided, and which attends cleaning them from the deposit of silt or earthy matter, which, more or less, obtains when the gravel-beds are employed; second, to enable the manipulators to easily remove the dead eggs while immersed in water of the same temperature as is used in the hatching-troughs; third, to preserve the fish, when hatched, within the boxes wherein they are hatched, and whence they may be easily and safely removed, when desired; and, fourth, to not only save labor, but to insure the hatching of more eggs than in the hatching-troughs usually employed.

Figure 1 is a plan view of a section of a hatching-house built upon my improved plan. Fig. 2 is a vertical section on the line $x\ x$ in Fig. 1. Fig. 3 is a plan view of the cross-bar which retains the hatching-box in place in the troughs, and at the same time confines the perforated top of the hatching-boxes. Fig. 4 is a sectional perspective of one of the hatching-boxes with the perforated top or cover in place. Fig. 5 is a perspective of one of the water-ways or channels which leads from one compartment of the troughs to another. Fig. 6 is a perspective of an inverted hatching-box.

Like letters refer to like parts in each figure.

In the accompanying drawings, A represents the walls of a hatching-house, provided at one end with an elevated water-tank, B, from which the water flows through pipes or faucets $a\ a'$, as desired. C are the various compartments of the hatching-troughs, made water-tight, and the walls and divisions somewhat higher than the hatching-boxes D, and so provided with waste-water ways or channels $b$ that the water in the troughs shall never flow over the tops of the boxes. These latter are constructed somewhat smaller than the compartments in the troughs wherein they are placed, and they are provided with feet $c$ to raise them sufficiently from the floor of the troughs to allow a free passage of water under them, and to raise them above any sediment that may be deposited on said floor. The bottom of these boxes is covered with a fine wire gauze, sufficiently fine that the fish, when hatched, cannot pass through the meshes. Small risers $d$ are secured to the ends of the boxes just above the bottom, and upon these bottoms are placed a portion of the eggs to be hatched. A series of sieves, E, the meshes of which are fine enough to retain the eggs placed therein, and large enough to permit a free passage of the young fish, are successively placed, one above the other, in the boxes, until the same are nearly filled—each one of these sieves having its proportion of eggs deposited thereon. A pan, F, made of perforated sheet metal, is then placed as a cover to prevent the eggs from floating. The hatching-boxes being thus prepared are placed one in each compartment of troughs C, and with one end resting against that side of the compartment whence the water is received. A cross-bar, G, is then inserted into small slots $e$ in the sides of the troughs, and, resting upon the tops of the boxes, prevents them from floating when the troughs are partially filled with water. These cross-bars are provided with feet $f$, so adjusted that, when the bar is in place, the feet will rest against the perforated cover and prevent it from floating. When all the boxes have been thus placed and secured in the various successive compartments of the troughs, the water is let on through the pipes or faucets hereinbefore described, as leading from the tank B, and falls onto the perforated covers of the boxes in the first compartments of the trough, and by means of the perforations in the covers is equally distributed over their surfaces, and runs down through the eggs upon the sieves below supplying them with constantly-changing fresh water, and washing the eggs thoroughly, carrying down any sediment or impurity and depositing it upon the floor of the trough. As the first compartments fill with water the wasteways *b* allow it to pass onto and through the boxes in the next compartments of the trough, and so on, successively, until the water is finally discharged out of the hatching-house in any convenient way, and at the end opposite the tank. Great care must be taken to so arrange the wasteways that the water will be discharged from one compartment into the next succeeding one, before it reaches such a depth that it would flood or run over the sides of the hatching-boxes. At its lower end each one of these water-ways is provided with a perforated or wire-gauze screen, *h*, to prevent the possibility of the fish, when hatched, passing from one compartment to another. When the hatching is complete, the cover may be removed from the boxes, and the young fish removed at will.

Many eggs, in the process of hatching, die, and it becomes necessary to remove the dead eggs to prevent injury to the others. To accomplish this, near each series of compartments there is placed a shallow trough, H, into which the water is fed from the tank B through the faucet *a'*, as shown. An operator removes one of the sieves from the hatching-boxes and places it in the trough H, through which the water of the same temperature flows from the tank, and of sufficient depth not to float the eggs. The dead eggs are removed in the usual way, and the sieve replaced in the hatching-box. The screen *h* is placed across the discharge end of the water-ways, and is to prevent the small fish from ascending the current. Ordinarily screens are so placed and the hatching-troughs so arranged that the fish are carried down with the current against the screen, choking the same, and damming the water until it overflows, carrying with it great quantities of fish which are thus lost.

By my plan of confining the fish, when hatched, to the boxes wherein they are hatched, they can never escape into the troughs, and, consequently, cannot get into the current through the wasteways and choke the screens. The passage of the water down through the boxes is so broad, being the full size of the interior of the boxes, that the fish are not carried or forced downward; but they rise naturally, and these screens *h* are placed, as described, to prevent the fish from passing up the current.

What I claim as my invention, and desire to secure by Letters Patent, is—

1. A fish-hatching house, wherein the water-tank B, hatching-troughs C, hatching-boxes D, cleaning-trough H, and water-ways *b* are constructed and arranged with relation to each other, substantially as and for the purposes herein set forth.

2. In combination with any suitable troughs C, the hatching-boxes D, provided with feet *c*, gauze-bottom sieves E, and a perforated pan-cover F, arranged to receive the water in the pan on top and discharge it below, substantially as and for the purposes specified.

3. The cross-bar G, constructed as described, in combination with the troughs C and hatching-boxes D, for the purposes set forth.

4. In combination with hatching-boxes, the perforated pan-cover F, as described, and for the purposes set forth.

NELSON W. CLARK.

Witnesses:
   C. E. B. HUESTIS,
   H. S. SPRAGUE.